(12) United States Patent
Boe

(10) Patent No.: US 7,252,317 B2
(45) Date of Patent: Aug. 7, 2007

(54) INTEGRAL STAKE RACK

(75) Inventor: Lowell S. Boe, Rugby, ND (US)

(73) Assignee: Rugby Manufacturing Company, Rugby, ND (US)

( * ) Notice: Subject to any disclaimer, the term of this patent is extended or adjusted under 35 U.S.C. 154(b) by 231 days.

(21) Appl. No.: 11/201,644

(22) Filed: Aug. 11, 2005

(65) Prior Publication Data
US 2005/0269836 A1 Dec. 8, 2005

Related U.S. Application Data

(63) Continuation-in-part of application No. 29/213,875, filed on Sep. 23, 2004, now abandoned, which is a continuation-in-part of application No. 29/180,330, filed on Apr. 23, 2003, now Pat. No. Des. 496,619.

(51) Int. Cl.
B60P 7/00 (2006.01)

(52) U.S. Cl. .................. 296/43; 296/181.1; 296/181.7; 296/186.5

(58) Field of Classification Search .................. 296/43, 296/180, 181.4, 181.7, 182.1, 183.1, 186.1, 296/186.4, 186.5, 26.01, 100.13, 37.6, 61, 296/26.08, 26.09, 26.1, 26.11; 414/537, 414/800; 292/210–212
See application file for complete search history.

(56) References Cited

U.S. PATENT DOCUMENTS 3,986,317 A 10/1976 Mountz

| 4,216,988 | A | 8/1980 | Weiss |
| 4,703,969 | A | 11/1987 | Rayburn et al. |
| 4,826,237 | A | 5/1989 | Socha |
| 5,071,185 | A | 12/1991 | Schiele |
| 5,516,067 | A | 5/1996 | Schiele |
| 6,053,545 | A | 4/2000 | Asmundson et al. |
| 6,152,510 | A | 11/2000 | Newsome |
| D442,519 | S | 5/2001 | Sacco et al. |
| 6,412,877 | B1 | 7/2002 | Faison |
| D469,388 | S | 1/2003 | Mighell |
| 6,554,342 | B1 | 4/2003 | Burnett |

*Primary Examiner*—Lori L. Lyjak
(74) *Attorney, Agent, or Firm*—Kinney & Lange, P.A.

(57) ABSTRACT

An integral stake rack panel, for constructing a box of a truck or trailer, includes a base structure fabricated from a single sheet of material, and containing a plurality of corrugated regions. The panel also includes generally flat regions between adjacent corrugated regions, wherein each generally flat region contains a plurality of apertures. A plurality of mounting members are attached to the corrugated regions, wherein the an end of each mounting member extends past the bottom parallel side of the base structure.

18 Claims, 6 Drawing Sheets

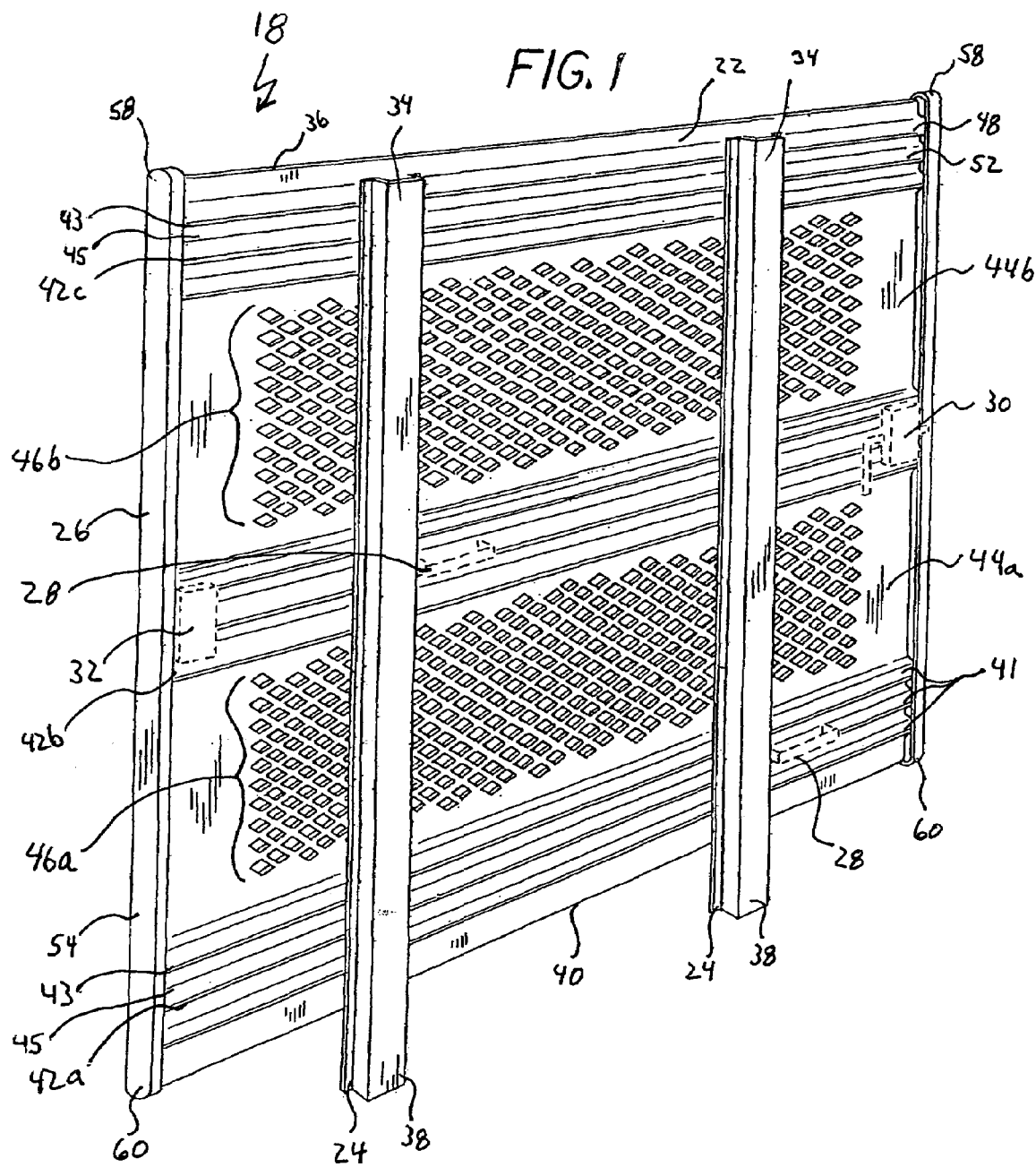

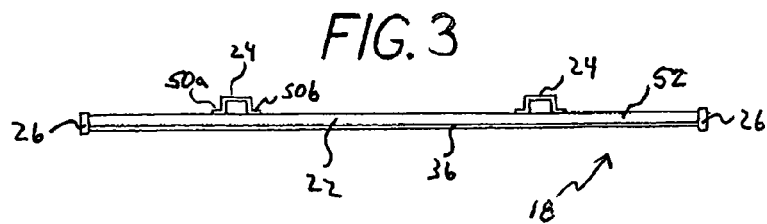
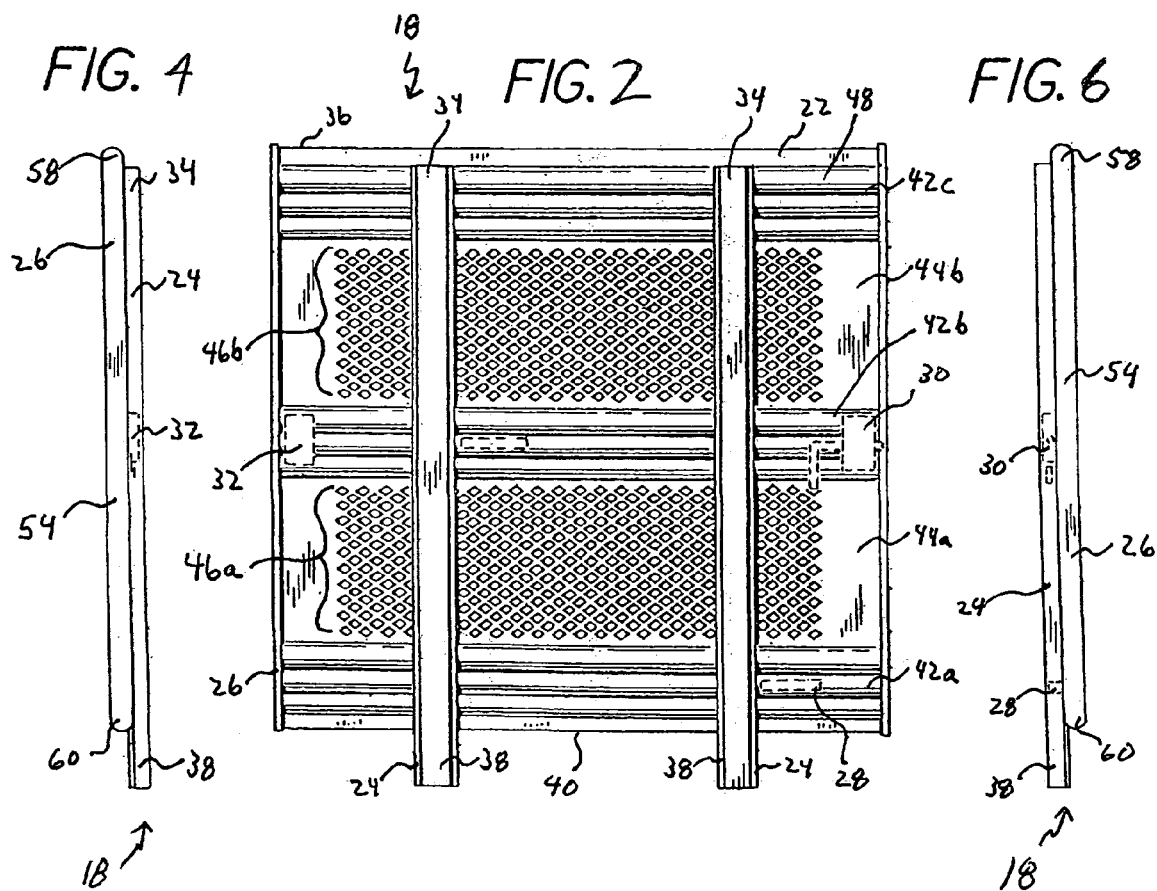
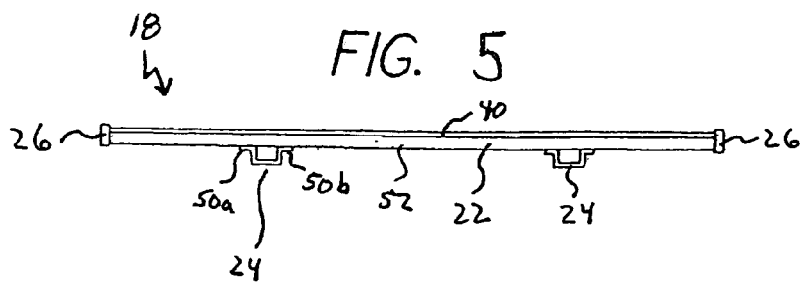

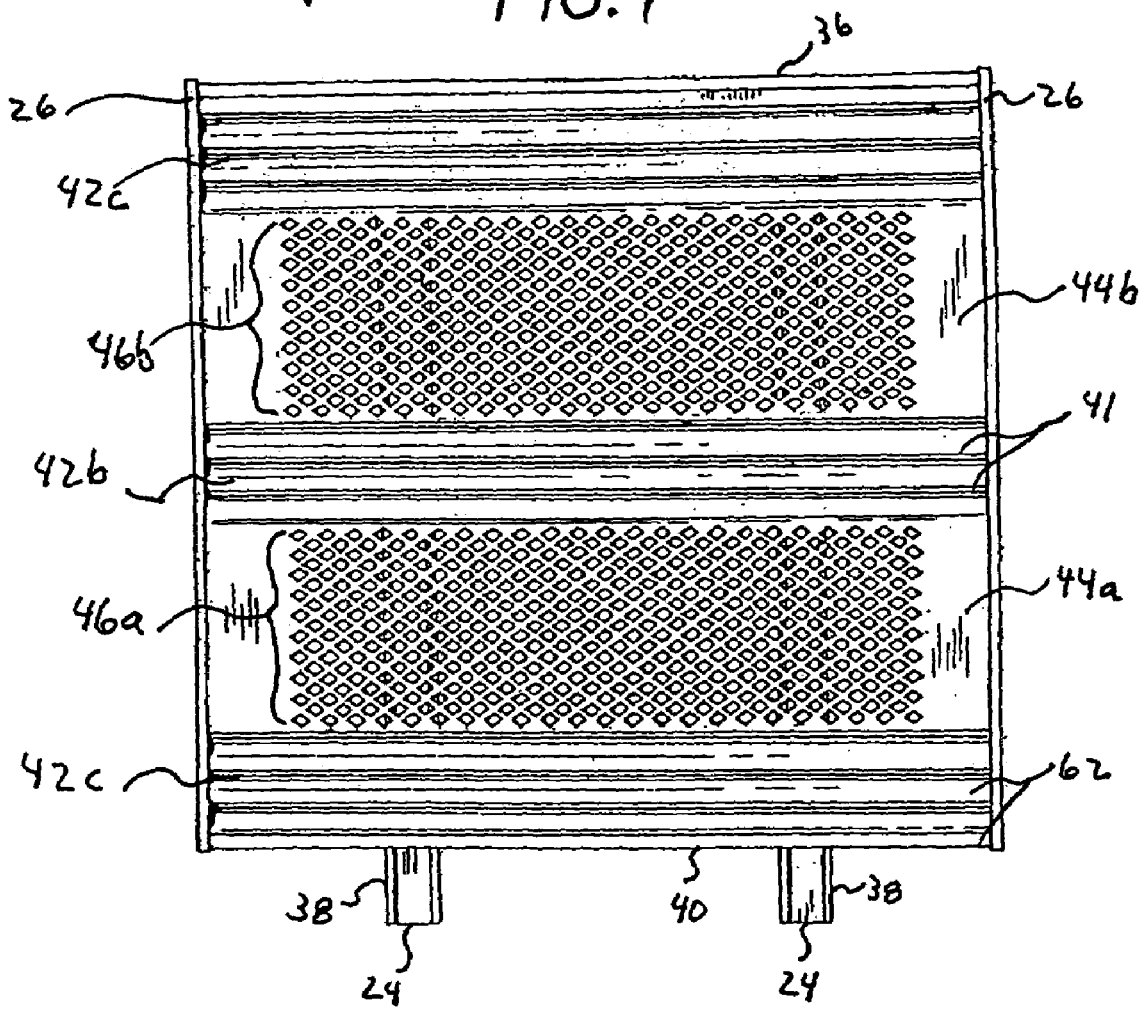

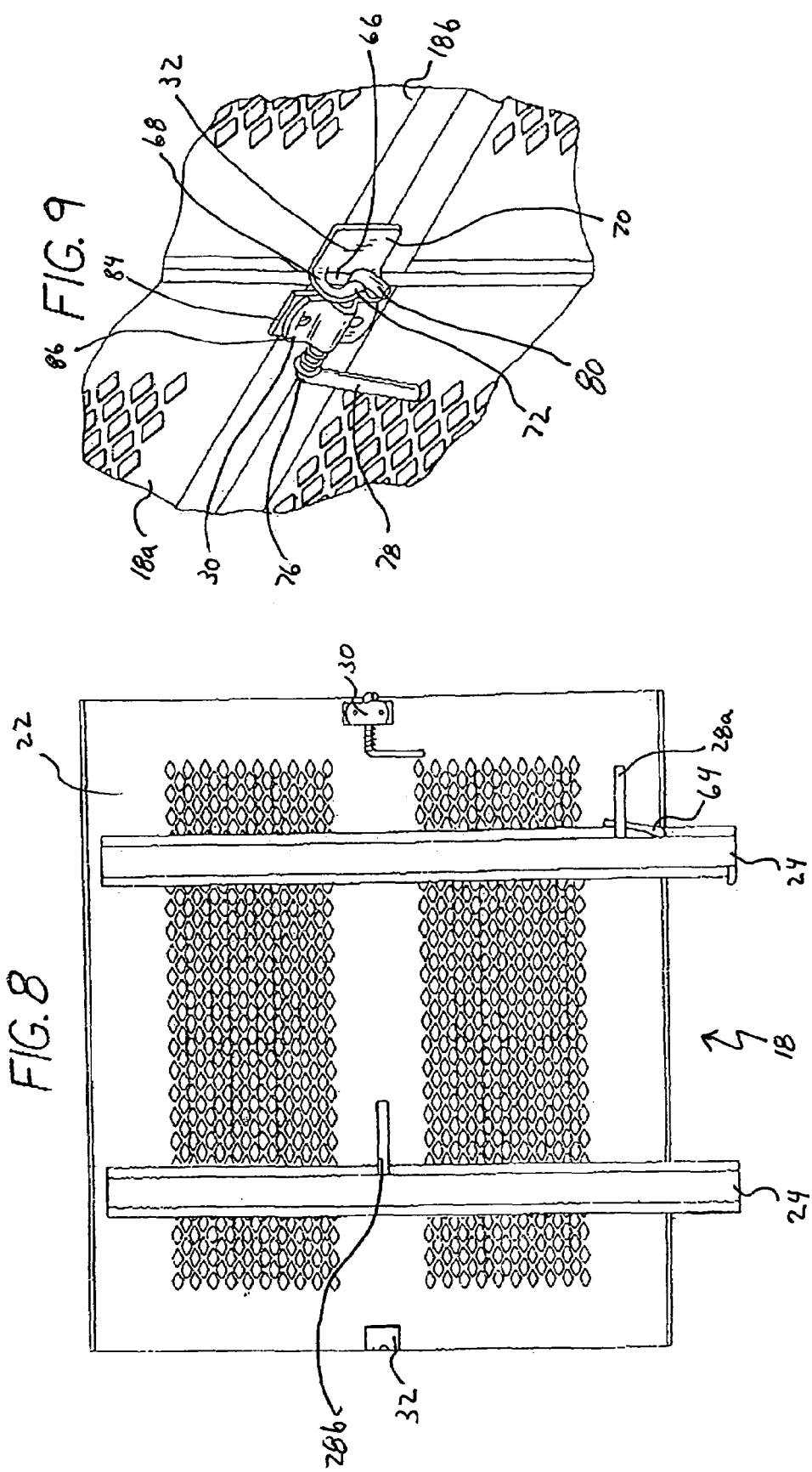

INTEGRAL STAKE RACK

CROSS-REFERENCE TO RELATED APPLICATION(S)

This application is a continuation-in-part of U.S. patent application Ser. No. 29/213,875, filed Sep. 23, 2004, now abandoned entitled INTEGRAL STAKE RACK, which is a continuation-in-part of U.S. patent application Ser. No. 29/180,330, filed Apr. 23, 2003, now U.S. Pat. No. D496,619, issued Sep. 28, 2004, entitled INTEGRAL STAKE RACK.

BACKGROUND OF THE INVENTION

The current invention concerns heavy duty stake rack panels. Racks for use with flatbed trucks and trailers are known within the art. The volume of cargo carrying capacity of a truck or trailer is limited by the surrounding walls of the stake rack system. Typically, a stake rack system includes several panels comprised of a series of horizontal members attached to a series of vertical posts or stakes. These posts or stakes are positioned to correspond with sockets contained within the outer perimeter of the top surface of either a truck bed or trailer bed. Often, the panels are made to be inserted separately and secured to one another with fasteners. Each side of the truck box comprised of the stake rack is a separate panel or a plurality of panels. The panels are removable to allow greater versatility and use of the truck. For example, a side panel may be removed to allow loading of the cargo. The panel can then be replaced and secured relative to the other panels to maintain the cargo within the enclosure created by the panels.

Typical stake rack panels comprised of a plurality of horizontal members attached to a plurality of vertical stakes are constructed so the horizontal members are spaced apart from one another and do not overlap. This leaves a gap that allows smaller material to escape from the cargo area A typical application of such stake racks is used in landscaping. Small loose material such as leaves or mulch is loaded into the cargo area. As the trailer or truck is driven down the highway, much of the cargo is allowed to escape by blowing through the gaps between the horizontal members of the panels. One solution to this problem has been to attach another sheet of material such as an expanded wire mesh to the stake rack panel. There are draw backs to this method, including that the wire mesh is easily deformed and ruptured. Also, the mesh must be secured to the panels which involves an additional material component when constructing the stake rack panels. The present invention seeks to eliminate these problems through the design of a unitary structure for a stake rack panel attached to the posts of the panel.

BRIEF SUMMARY OF THE INVENTION

An integral stake rack panel for constructing a box of a truck or trailer, the panel comprising a base structure having a rectangular perimeter which is fabricated from a single sheet of material, and containing a plurality of corrugated regions. Two of the corrugated regions are proximate opposite parallel sides of the panel. The panel also comprises generally flat regions between adjacent corrugated regions, wherein each generally flat region contains a plurality of apertures. A plurality of mounting members, each containing a first end and a second end, are attached to the corrugated regions. The first end of each mounting member extends past the bottom parallel side of the base structure.

BRIEF DESCRIPTION OF THE DRAWINGS

FIG. 1 is a perspective view of the inventive stake rack panel.

FIG. 2 is an elevation view of the front of the inventive stake rack panel.

FIG. 3 is a top plan view of the inventive stake rack panel.

FIG. 4 is an elevation view of the left side of inventive stake rack panel.

FIG. 5 is a bottom plan view of the inventive stake rack panel.

FIG. 6 is a elevation view of the right side of the inventive stake rack panel.

FIG. 7 is a elevation view of the back of the inventive stake rack panel.

FIG. 8 is an elevation view of the inventive stake rack panel containing mounting hardware and accessories.

FIG. 9 is a perspective view of a latching mechanism to secure adjacent stake rack panels.

DETAILED DESCRIPTION

Figure 11:
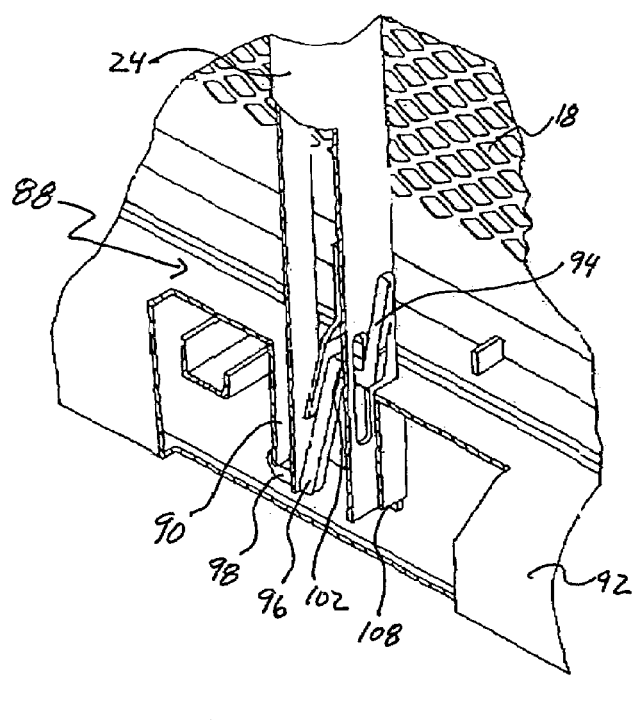
FIG. 11 is a perspective view, with a section removed, of a locking mechanism for the stake of the inventive stake rack panel mounted into a socket of a truck rail.

FIG. 1 is a perspective view of stake rack panel 18, which includes main body panel 22, posts 24, and end caps 26, with handles 28, latch mechanism 30, and catch 32 shown in phantom.

Main body panel 22 is constructed from a single sheet of material having a top edge 36 and a bottom edge 40. Material is a rigid material capable of deformation and fabrication such as metals, including steel or aluminum, and thermoplastics. Main body panel 22 contains a plurality of corrugated regions 42a-42c. Preferably, one corrugated region 42c is adjacent top edge 36 of main body panel 22, and a second corrugated region 42a is adjacent bottom edge 40 of main body panel 22. In one embodiment, top edge 36 and bottom edge 40 are hemmed, that is, formed by folding the sheet material of main body panel 22 back onto itself. One or more additional corrugated regions 42b are spaced between the upper and lower corrugated regions 42a and 42c. Corrugated regions 42 are generally parallel to one another and have a symmetrical spacing throughout main body panel 22.

Between each adjacent set of corrugated regions 42a-42c is a planar region 44a or 44b containing a series of apertures 46a and 46b. In the embodiment illustrated, there are two generally planar regions, 44a and 44b, each between adjacent corrugated regions 42a and 42b, and 42b and 42c, respectively. A series of apertures 46a and 46b are contained within a portion of generally planar regions 44a and 44b, respectively. A perimeter comprising a solid strip of material is present on each side of the perimeter of series of apertures 46a and 46b. The amount of solid planar material about series of apertures 46a and 46b varies depending on the design of the panel for visibility and weight. As illustrated, series of apertures 46a and 46b is a pattern of diamond shaped cutouts of the material comprising main body panel 22. Series of apertures 46a and 46b is a repeating pattern in one embodiment. Although illustrated as diamonds, other shapes are envisioned such as squares, circles, ovals, triangles, or other polygons.

In constructing main body panel 22, a series of fabrication steps are done. First, a sheet of material is cut to an appropriate flat pattern size. Top edge 36 and bottom edge 40 are hemmed. Next, each series of apertures 46a and 46b are fabricated. This can be done with common manufacturing equipment such as a punch press, laser cutting, plasma cutting, or similar item known in the industry for creating apertures 46a and 46b in sheet material. After creating series of apertures 46a and 46b in the main panel blank, corrugated regions 42a-42c are then formed. The perimeter of solid material about series of apertures 46a and 46b assures that the breaks in the sheet material are across a solid plane. The solid perimeter promotes uniformity in manufacturing compared to a break done on a perforated material, which though possible, can give varying angles if the series of apertures is not uniform among the blanks prior to bending the sheet material to create corrugated regions 42a-42c.

Typically, a brake press is used to create corrugated regions 42a-42c which contains tooling capable of creating multiple deformations in one hit. Alternately, each corrugated region 42a-42c is created by a series of hits with a brake press, fabricated by putting the sheet material through a series of rollers to roll form the regions, or created using a similar sheet deforming device that creates peaks 43 and valleys 45 of the corrugated region 42a-42c. In the embodiment illustrated, corrugations 41 are generally u-shaped. Alternately, corrugations 41 may be v-shaped or s-shaped. Corrugated regions 42a-42c add strength and support to the areas of the panels. In addition, the corrugations create an offset for mounting posts 24 to main body panel 22. This results in the cargo area being centered on the bed of a vehicle further, bottom edge 40 of the panel rests on the bed of the vehicle, and not on the sockets or rails, to provide stable surface with support for the stake rack panel. After main body panel 22 has been formed, additional components of the stake panel are secured to main body panel 22.

Posts 24 are the stakes used to mount the stake rack panel 18 into corresponding structures such as sockets of a rail. Posts 24 are constructed from steel hat channels. In alternative embodiments, posts may be constructed from any rigid channel, angle, or tubing which is capable of insertion into corresponding sockets within a truck or trailer bed. Each post 24 contains a top end 34 attached adjacent to top edge 36 of main body panel 22, and a bottom end 38 which extends past bottom edge 40 of main body panel 22. Bottom end 38 is a portion of post 24 which is of a length that allows stability of the stake rack panel when inserted into the sockets of the trailer or truck bed. Typically, the length of the bottom end 38 is several inches to about two feet long.

End caps 26 cover and protect the outer perimeter of the main body panel 22. End caps 26 are plates or coverings which are constructed from metal channel, metal sheet or plate, or bar stock. Each end cap 26 contains a flat outer edge 54 and rounded tops and bottoms 58 and 60. End caps 26 are sized to be of a width, or to contain a channel which has an inner width greater than the height of the corrugations of the main body panel 22. End caps 26 are equal in length or nominally longer than the height of main body panel 22. Alternatively, end caps 26 are a series of pieces that cover corrugated regions 46a-46c of main body panel 22.

FIG. 2 is a front elevation view of stake rack panel 18 showing main body panel 22, posts 24 and end caps 26. Illustrated in phantom in FIG. 2 are accessories for stake rack panel which include two handles 28, latching mechanism 30, and corresponding catch 32. In this embodiment, posts 24 are parallel to end caps 26. End caps 26 are placed about opposing parallel ends of main body panel 22. Posts 24 are attached so that they are perpendicular to corrugated regions 42a-42c of main body, panel 22. As illustrated, posts 24 are the same length to eliminate multiple parts and aid in simplification of tooling design and manufacturing of stake rack panel 18. In alternate embodiments, one post 24 is longer that the others connected to main body panel 22. This aids the installation of the rack by allowing a first longer post to be inserted, and then aligning the remaining post or posts rather than aligning all the posts at the same time. Bottom portion 38 of each post 24 extends past lower edge 40 of main body panel 22. Top end 34 of each post 24 terminates at the top most corrugation 48 of upper most corrugated region 42c.

In the embodiment illustrated, main body panel 22 is comprised of three generally parallel corrugated regions 42a, 42b, and 42c separated by two generally flat planar regions 44a and 44b. Alternately, main body panel 22 may contain at least one generally flat planar region and at least two corrugated regions, or a plurality of planar regions with each planar region adjacent a corrugated region. In one embodiment, one corrugated region is adjacent top edge 36 and one corrugated region is adjacent bottom edge 40 of main body panel 22. In one embodiment, all corrugated regions are of generally uniform dimensions with respect to one another. Similarly, all planar regions and series of apertures are generally uniform with respect to another. In an alternate embodiment, the corrugated regions, planar regions, and series of apertures are of varying dimensions.

Both the corrugated regions and the planar regions are all constructed from one sheet of material. The planar regions (e.g., 44a and 44b) also contain the series of apertures (e.g., 46a and 46b). Each series of apertures 46a and 46b allow visibility into the cargo area, as well as reduce weight of the panel. At the same time, each aperture contains a perimeter that is small in area to prevent cargo loaded into the cargo area from passing through the stake panel. In one embodiment, each series of apertures is a random collection of apertures of varying sizes, profiles, and/or locations.

FIGS. 3 and 5 are top and bottom plan views of the stake rack panel 18. In this embodiment, panel 18 is comprised of main body panel 22, posts 24, and end caps 26. Posts 24 are constructed from a hat channel. The flat outer edges 50a and 50b; of the hat channel rest against peaks 52 of corrugated regions 42a-42c. This separates the stakes comprised of posts 24 from generally planar regions 44a and 44b that contain series of apertures 46a and 46b. Top most corrugated region 42c and bottom most corrugated region 42a are each terminated with a section of material that is coplanar with planar panel portions 44. Mounting the hat channels to peaks 52 of corrugated regions 42a-42c creates an offset which allows for placement of items behind posts 24 but in front of generally planar regions 44a and 44b, and can secondarily act as a place to grip the stake rack panel.

FIGS. 4 and 6 are elevation views of the left and right side, respectively, of stake rack panel 18. Visible in each of these views are end caps 26 and posts 24. Illustrated in phantom are a latch mechanism 30 in FIG. 6, and a corresponding catch mechanism 32 in FIG. 4. Handle 28 is also illustrated in phantom in FIG. 6. End caps 26 are constructed from bar stock. End caps 26 are attached to main body panel 22 by welding or similar permanent fastening process if the material used is not metal. End caps 26 are wide enough to cover corrugated regions 42a-42c of main body panel 22 of FIG. 2. Outer edge 54 of each end cap 26 is a generally flat planar area, which aids in aligning the stake rack panels next to one another in succession. Top and bottom portions 58 and 60, respectively, of each end cap 26 are curved. This eliminates sharp edges to prevent catching and snagging of materials on the corners of main body panel 22. Bottom portions 38 of posts 24 extend past bottom portions 60 of end caps 26. Similarly, top portions 58 of end caps 26 extend past top portions 34 of posts 24.

FIG. 7 is an elevation view of the back of stake rack panel 18. In this view, posts 24 can be seen behind the series of apertures 46a and 46b. Also, planar regions 44a and 44b containing the series of apertures 46a and 46b as well as top edge 36 of top corrugated region 42c and bottom edge 38 of bottom corrugated region 42a, and valleys 62 of the other corrugated regions 42a-42c are all generally coplanar as well as offset from post 24. End caps 26 are the same width as the height of corrugations 41, or slightly greater. Planar regions 44a and 44b will be the inner edge of the wall of the cargo box of the truck or trailer.

FIG. 8 is an elevation view of the stake rack panel 18 containing mounting hardware and accessories. In addition to main panel 22 and post 24, stake rack panel 18 also contains latching mechanism 32, latching catch 30, handles 28, (previously shown in phantom in FIGS. 1-6) and rail locking mechanism 64. Handles 28 are structures that are used as grips for a person to hold and balance stake rack panel 18 for insertion and removal from a bed of a truck or trailer. Handles 28 can be prefabricated and bought at a local hardware store, or may be fabricated by bending a couple of opposing ninety degree bends into metal bar stock and welding it to main body panel 22. In the embodiment shown in FIG. 8, one handle 28a is placed near the rail locking mechanism 64 on post 24, while another handle 28b is located next to the opposite post 24 and centrally located within main body panel 22. This placement allows for a user to maintain balance of the rack panel 18 during insertion or removal of the panel. Handles 28a and 28b can be welded to the top of the corrugations 41 of the corrugated regions 42a-42c. This placement allows the maximum distance between handles 28a and 28b and main body panel 22 which makes for a larger area for insertion of the hand to grip handles 28a and 28b.

FIG. 9 is a perspective view of latching and catch mechanisms 30 and 32 to secure adjacent stake rack panels. Illustrated are two panels 18a and 18b, one (panel 18a) containing latching mechanism 30, while the other (panel 18b) contains corresponding catch 32. Catch 32 is a L-shaped piece of material with aperture 66 in portion 68 that extends perpendicular to the panel. Flat portion 70 is secured to panel 18b such as by riveting or welding. Perpendicular extension 68 containing aperture 66 may also contain arc deformation 72 in the portion of material furthest from panel 18b. This deformation 72 acts to hold catching member 80 of locking mechanism 30 in place.

Latching mechanism 30 is comprised of lever 76, handle 78, catching member 80, spring 82, and mounting plates 84 and 86. As illustrated, lever 76, handle 78, and catching member 80 are fabricated from a circular metal rod which has been bent in two areas. Both handle 78 and catch member 80 are perpendicular to lever 76. In one embodiment, handle 78 and catching member 80 are parallel to each other, while in another embodiment, handle 78 and catching member 80 are at an angle to one another. Mounting plate 86 is a flat piece of metal that is attached to main body panel 22. Mounting plate 86 contains a central U-shaped location for holding lever 76, and two flat extensions which contain apertures. Corresponding apertures maybe found in mounting plate 84. A lever is inserted into the U-shaped slot of mounting member 86 and then both mounting members 84 and 86 are secured using fasteners through the apertures. Alternately, the mounting plates may be secured to main body panel 22 by welding or similar permanent connection.

Spring 82 is placed on lever 76 between handle 78 and mounting plates 84 and 86. Spring 82 exerts a force outward on handle 78 causing catching member 80 to engage perpendicular portion 68 of catch mechanism 32. The latch is shown in the locked position. To unlock latching mechanism 30, handle 78 is pressed towards catch mechanism 32 to compress spring 82 and then is rotated upward once the catching member 80 is clear of arc deformation 72 of catch mechanism 32. Handle 78 is rotated until catch member 80 is aligned with aperture 66 to allow removal of catch member 80.

Other common latching and hitching mechanisms may also be used, including a hasp comprising a flat plate and a hinge portion connected to one panel side, with a swivel plate connected to the other, or a similar fastener. Latching mechanism 30 and catch mechanism 32 secure adjacent panels with respect to one another to add stability and create a more solid wall for the box of the cargo area. Latching mechanism: 30 and catch mechanism 32 are spaced on the panels to allow interconnection of adjacent panels while also allowing removal of an individual stake rack panel 18a or 18b.

Figure 10:
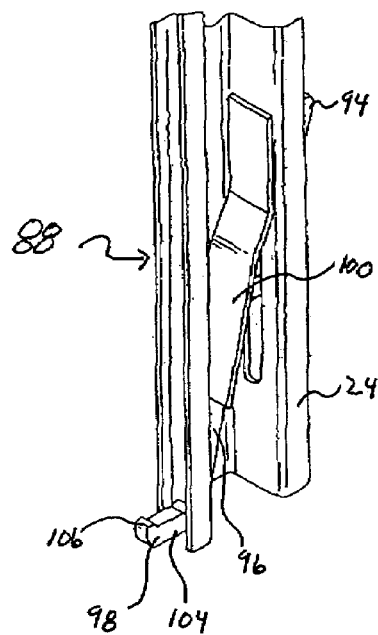
FIG. 10 is a perspective view of a post and locking mechanism of the inventive stake rack panel.

FIG. 10 is a perspective view of post 24 and rail locking mechanism 88. FIG. 11 is a perspective view, with a section removed, of a locking mechanism 88 for post 24 of stake rack panel 18 mounted in a truck. Illustrated in FIG. 11 are main body panel 22, post 24, locking mechanism 88, as well as rail 92 of a truck including socket 90. Post 24 has been inserted into socket 90. With the section removed, the interior of socket 90 is visible. This shows locking mechanism 88 securing post 24 within socket 90.

Latching mechanism 88 is comprised of handle 94, lever 96, catch member 98, and spring mechanism 100. Lever 96 is connected to handle 94 via short connecting member 102, and is also connected to locking mechanism catch member 98 (which contains a horizontal member 104 with a vertical extension 106 on one end). Handle 94, connecting member 102, lever 96, and catch member 98 are all manufactured from a single piece of material.

To insert or remove stake rack 18 from socket 90, a user will press handle 94 so it moves towards the channel of post 24. Lever 96 moves, which retracts locking mechanism 88 towards the center of the channel of post 24. This allows post 24 to be inserted into socket 90. Upon reaching the appropriate depth, handle 94 is released. Spring mechanism 100 exerts a force onto lever 96 forcing catch member 98 outward from the channel to extend and latch onto bottom 108 of socket 90 in rail 92. In the embodiment shown in FIGS. 10 and 11, spring mechanism 100 is a flat metal strip that has been deformed to create the appropriate tension on the lever. Other common spring mechanisms are envisioned, including compression or extension coil springs, disk springs, or torsion springs. To remove rack panel 18 from rail 92 of the truck, handle 94 is again pressed towards the body of the channel of post 24, thus swinging lever 96 to remove catch 98 from contact with bottom 108 of socket 90. Panel 18 can then be removed.

Figure 12:
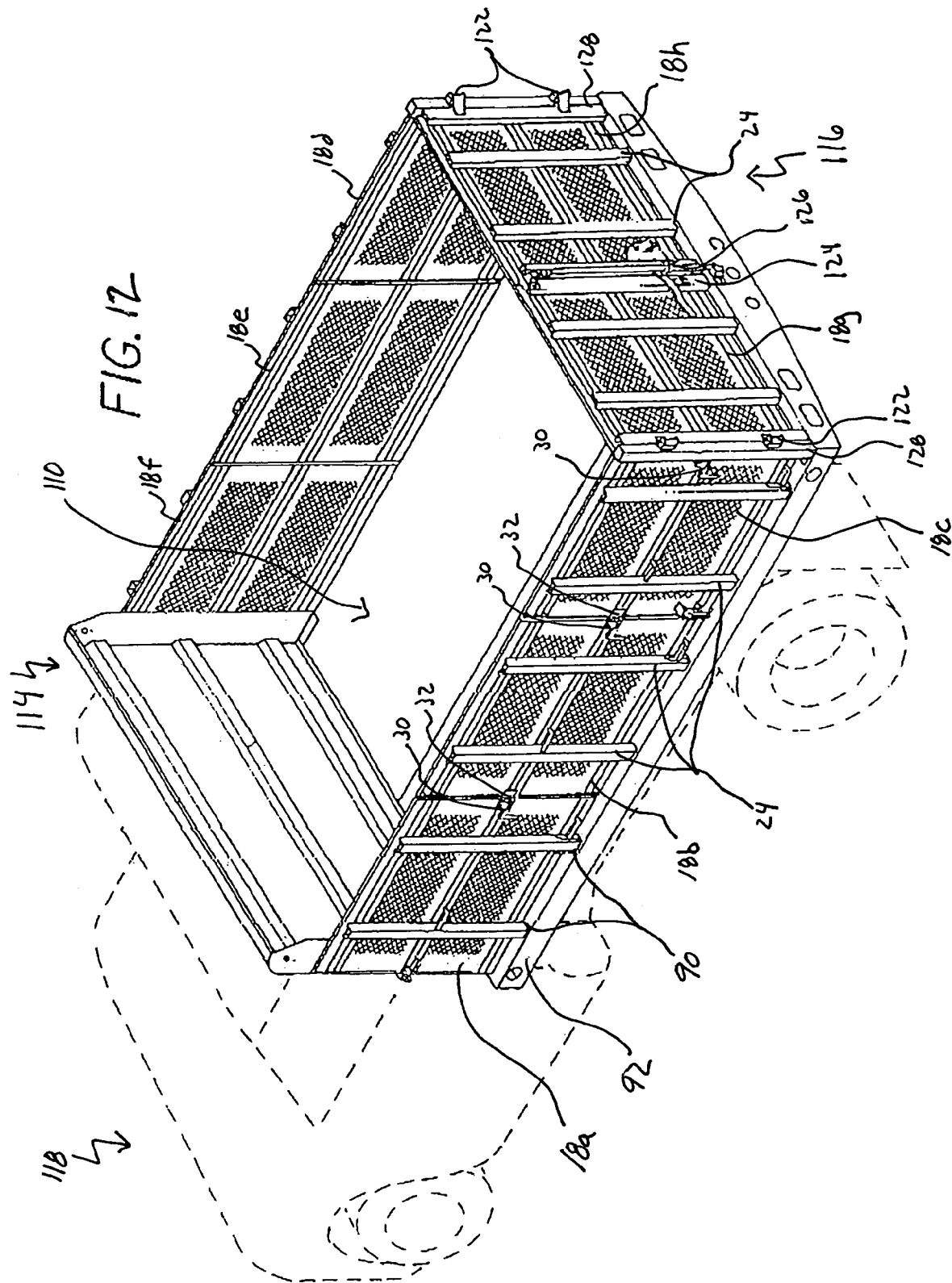
FIG. 12 is a perspective view of a cargo area composed of the inventive stake rack panels.

FIG. 12 is a perspective view of a cargo area 110 comprised of several of the stake rack panels 18a-18h of the present invention. The series of panels 18a-18h create an enclosed area on bed 120 of truck 118 resulting in the formation of the cargo area 110 on the bed 120 of a truck 118. In the embodiment illustrated, side wall 112 of truck 118 is comprised of three adjacent stake rack panels 18a-18c and side wall 114 is comprised of panels 18d-18f. Posts 24 have been inserted into sockets 90 of rail 92 of truck 118. Adjacent panels have been secured using latching mechanisms 30 and catch mechanisms 32. Stake rack panels 18a-18f are further secured to rail 92 via rail latching mechanisms 88.

Two rear stake rack panels 18g and 18h also act as a gate. On these panels, hinges 122 are contained on one sidewall, and a latching mechanism 124 or corresponding catch 126 is contained on the other. Posts 24 do not extend past the lower bottom edge of the main body of panels 18g and 18h. Latching mechanisms 124 and hinges 122 allow stake rack panels 18g and 18h to be quickly unhooked from each other and rotated about back corner posts 128 allowing for access to the cargo area 110. Even though stake rack panels 18g and 18h contain posts 24 of a different length and/or size, stake rack panels 18g and 18h are still constructed from a single piece of material.

Although the present invention has been described with reference to preferred embodiments, workers skilled in the art will recognize that changes maybe made in form and detail without departing from the spirit and scope of the invention.

The invention claimed is:

1. An integral stake rack panel for constructing a box of a truck or trailer, the panel comprising:
    a base structure fabricated from a single sheet of material, the base structure having a rectangular perimeter, and containing a plurality of corrugated regions, wherein two corrugated regions are proximate opposite parallel sides of the perimeter and generally flat regions between adjacent corrugated regions, wherein each generally flat region contains a plurality of apertures; and
    a plurality of mounting members containing a first end and a second end which are attached to the corrugated regions, wherein the first end of each mounting member extends past the perimeter of the base structure.

2. The integral stake rack panel of claim 1 further comprising:
    a first end plate and a second end plate attached to the base structure.

3. The integral stake rack panel of claim 2 further comprising;
    a latch mechanism proximate to the first end plate; and
    a catch proximate to the second end plate.

4. The integral stake rack panel of claim 1 wherein the plurality of corrugated regions are generally parallel to one another, and wherein the plurality of mounting members are generally perpendicular to the corrugated regions.

5. The integral stake rack panel of claim 1 wherein the plurality of apertures are arranged in a repeating pattern.

6. The integral stake rack panel of claim 1 further comprising:
    one or more handles mounted to the corrugated regions of the base structure.

7. The integral stake rack panel of claim 1 further comprising:
    a latch mechanism attached proximate to the first end of at least one mounting member.

8. For use with a vehicle containing a cargo receiving surface to form a storage structure about the perimeter of the cargo receiving surface, a stake rack panel comprising:
    a single sheet of material, fabricated to contain a plurality of corrugated regions, wherein two corrugated regions separated by one or more generally flat planar regions, wherein each generally flat planar region contains a plurality of apertures; and
    a plurality of mounting stakes which are attached to the fabricated single sheet, wherein a portion of each mounting stake extends past an outer perimeter edge of the fabricated single sheet.

9. The stake rack panel of claim 8 further comprising:
    a plurality of end plates attached to the outer perimeter edges of the single sheet.

10. The stake rack panel of claim 9 further comprising;
    a latch mechanism proximate to a first perimeter edge of the single sheet; and
    a catch proximate to the perimeter edge of the single sheet.

11. The stake rack panel of claim 8 wherein the plurality of corrugated regions are generally parallel to one another, and wherein the plurality of mounting stakes are generally perpendicular to the corrugated regions.

12. The stake rack panel of claim 8 wherein the plurality of apertures are arranged in a repeating pattern.

13. The stake rack panel of claim 8 further comprising:
    one or more handles mounted to the corrugated regions of the single sheet.

14. The stake rack panel of claim 8 further comprising:
    a rail latch mechanism attached proximate to the portion of at least one mounting stake that extends past the outer perimeter edge of the single sheet.

15. A stake rack panel comprising:
    a solid, generally flat piece of material sized to allow for deformation of a plurality of portions;
    a series of apertures fabricated into a plurality of regions of the piece of material;
    a series of corrugations formed about two generally parallel sides of the series of apertures to create a body panel of a desired height;
    posts attached to the corrugations of the panels.

16. The panel of claim 15 further comprising:
    one or more accessories attached to the body panel from a group consisting of hinges, latching mechanisms, catching mechanisms, handles, and combinations thereof.

17. The panel of claim 15 wherein the series of apertures has a repeating pattern.

18. The panel of claim 15 wherein the series of apertures are punched diamonds.

* * * * *

UNITED STATES PATENT AND TRADEMARK OFFICE
CERTIFICATE OF CORRECTION

PATENT NO. : 7,252,317 B2 Page 1 of 1
APPLICATION NO. : 11/201644
DATED : August 7, 2007
INVENTOR(S) : Lowell S. Boe It is certified that error appears in the above-identified patent and that said Letters Patent is hereby corrected as shown below:

Column 5, Line 67, delete "maybe", insert --may be--

Column 7, Line 23, delete "maybe", insert --may be--

Signed and Sealed this

Thirteenth Day of November, 2007

JON W. DUDAS
*Director of the United States Patent and Trademark Office*